United States Patent [19]

MacCabee

[11] Patent Number: 5,110,203
[45] Date of Patent: May 5, 1992

[54] THREE DIMENSIONAL RANGE IMAGING SYSTEM

[75] Inventor: Bruce S. MacCabee, Sabillasville, Md.

[73] Assignee: The United States of America as represented by the Secretary of the Navy, Washington, D.C.

[21] Appl. No.: 751,371

[22] Filed: Aug. 28, 1991

[51] Int. Cl.⁵ .............................................. G01C 3/08
[52] U.S. Cl. ...................................... 356/5; 356/152; 356/376
[58] Field of Search ..................... 356/5, 152, 376; 250/332, 334, 598; 358/96, 212

[56] References Cited

U.S. PATENT DOCUMENTS

| 3,682,553 | 8/1972 | Kapany | 356/5 X |
| 4,199,253 | 4/1980 | Ross | 356/5 |
| 4,854,698 | 8/1989 | Schmidt | 356/5 |

*Primary Examiner*—Mark Hellner
*Attorney, Agent, or Firm*—Kenneth E. Walden; Jacob Shuster

[57] ABSTRACT

A pulse of luminant energy of short duration is reflected from a target as an echo source of both two dimensional target imaging data and target depth distance data by optical gating of the echo pulse at one receiving location. The pulse is thereby divided into image depth slices under control of timing signals in order to extract therefrom three dimensional imaging data during its short duration.

14 Claims, 2 Drawing Sheets

THREE DIMENSIONAL RANGE IMAGING SYSTEM

BACKGROUND OF THE INVENTION

This invention relates in general to radiation imaging systems providing both two-dimensional target data as well as target depth or ranging information.

Target imaging systems for obtaining depth or ranging data as presently known, involve the emission of electromagnetic radiation directed toward the target object so as to measure the time it takes for return of target reflected echo pulses. The extraction of target range data from echo pulse signals reflected from a target illuminated by light pulses emitted by a transmitter, is disclosed for example in each of U.S. Pat. Nos. 4,687,326, 4,722,599 and 4,920,412 to Corby, Jr., Frueget et al. and Gerdt et al., respectively. According to the Corby Jr., patent, three dimensional imaging of the target is essentially achieved by parallax involving comparison of target reflected radiation luminescence in different directions. The measurement of target depth from backscattered light intensities without any two-dimensional imaging, is disclosed in the Frueget et al. patent. The disclosure in the Gerdt et al. patent is of most interest because it teaches the provision of target depth measurements by use of a short laser pulse and a gated receiver. Three dimensional imaging according to the Gerdt et al patent would, however, require emission of a series of pulses from a laser source to obtain a corresponding series of range-gated echo pulses picked up at various distances from the laser source.

It is therefore an important object of the present invention to provide a target imaging system wherein echo pulses reflected from the target provide more accurate three dimensional imaging data extracted by means of a range gated receiver at a single receiving location.

An additional object in accordance with the foregoing object is to provide an echo pulse receiving system in which each pulse of short duration is an independent source of both two-dimensional imaging and ranging data at the receiving location so as to avoid image blurring because of target movement.

SUMMARY OF THE INVENTION

In accordance with the present invention, pulses of luminant energy reflected from a target are collected at a receiving location by an optically gated receiver within which each input pulse is divided into target depth slices through an optical delay and rapid shutter arrangement under control of timing signals derived by beam splitting from the same input pulse in order to extract distance or target depth data with high resolution as well as two dimensional imaging data.

BRIEF DESCRIPTION OF THE DRAWING FIGURES

Other objects, advantages and novel features of the invention will become apparent from the following detailed description of the invention when considered in conjunction with the accompanying drawing wherein.

DETAILED DESCRIPTION OF PREFERRED EMBODIMENT

Figure 1:
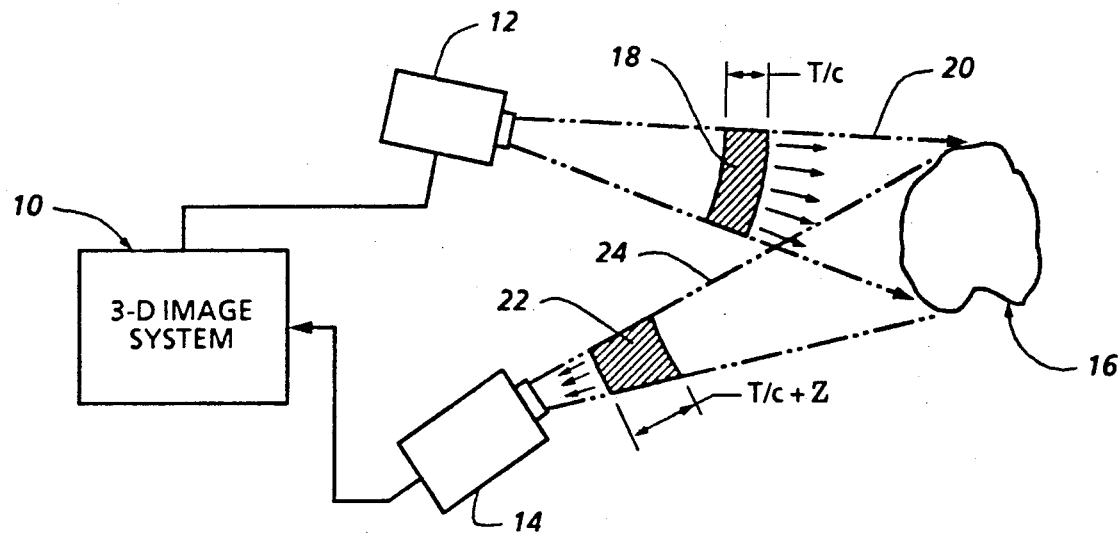
FIG. 1 is a schematic diagram illustrating operation of a target imaging system in accordance with the present invention.

Referring now to the drawing in detail, FIG. 1 diagrammatically illustrates a 3-dimensional imaging system generally referred to by reference numeral 10 associated with a radiation source 12 such as an optical pulse emitting laser generator and a data collecting receiver 14 at a single receiving location spaced by some distance from a target object 16. As diagrammed in FIG. 1, the source 12 emits brief luminant energy pulses 18 along a divergent radiation beam path 20 to the target 16. Each pulse 18 has a temporal duration T and hence a length in space equal to T/c, where c is the speed of light. The shortness of the pulse length T/c enables the achievement of good depth resolution through echo pulses 22 of imaging energy reflected from the target 16 toward the receiver 14 along a convergent radiation beam path 24 as also diagrammed in FIG. 1. The received echo pulse length is T/c+Z, where Z is the depth of the target object 16 so that for a pulse duration of T=0.1 nanoseconds, for example, a depth resolution of Z=3 cm could be obtained.

The source 12 is a coherent or incoherent source of light such as a laser device or a laser generator just as long as the duration T of each pulse 18 emitted therefrom is much shorter than Z/c. The echo pulses 22 of imaging energy are reflected from various portions of the target object 16 exposed to the luminant energy of the impinging radiation pulse 18. The target portions, from which pulses 22 are reflected, are not obscured from view at the receiving location of receiver 14 and have reflective surfaces at different distances from the receiving location so as to provide three dimensional imaging information.

Figure 2:
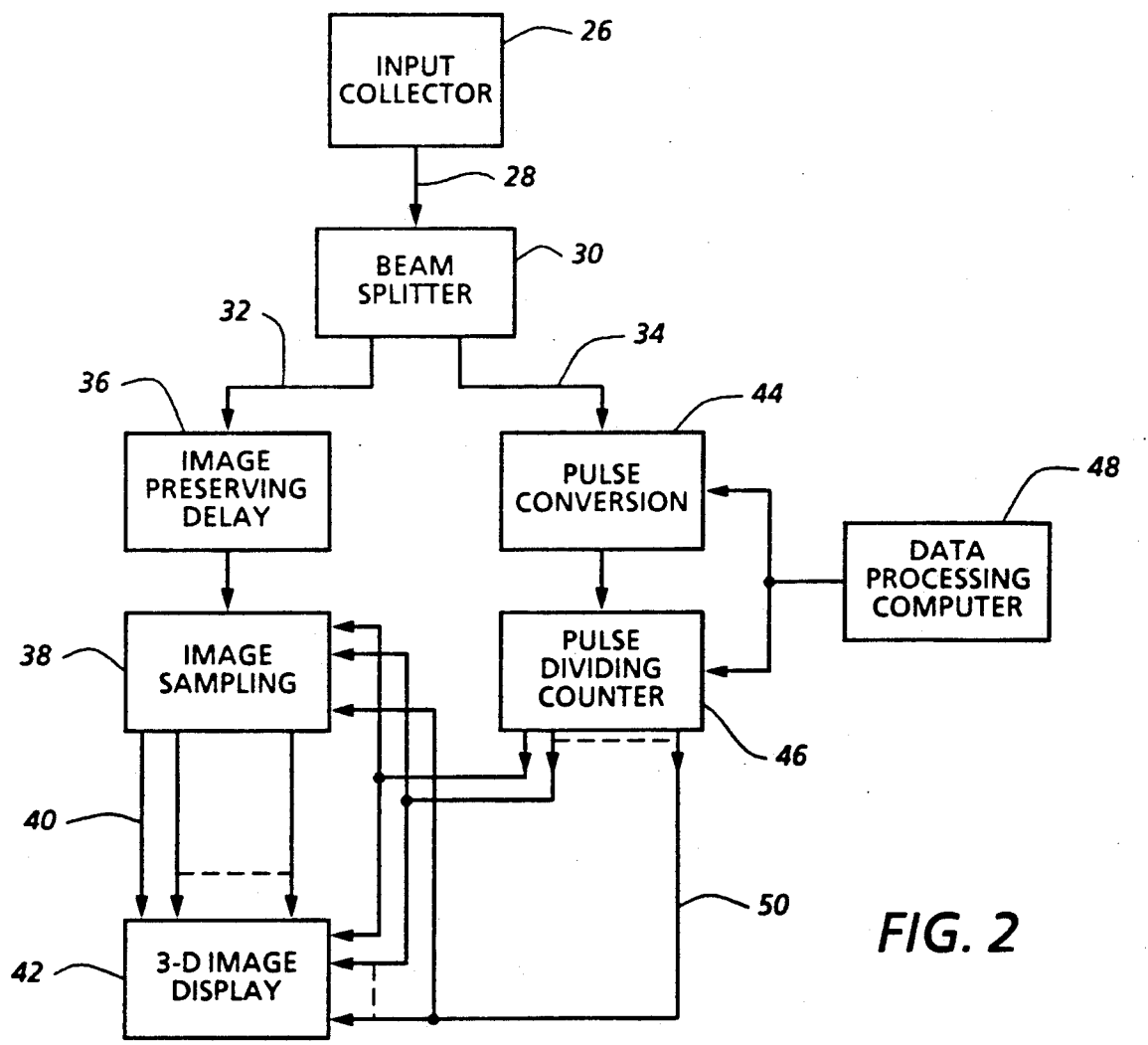
FIG. 2 is a block diagram of the optically gated receiver illustrated in FIG. 1.

Each echo pulse 22, as hereinbefore characterized, arrives at the receiver 14 to be collected by an input collector 26 as diagrammed in FIG. 2, forming a beam 28 containing the target image information. From the collector 26, the beam 28 is fed to a beam splitter 30 from which split beam portions 32 and 34 are conducted along separate paths. The split beam portion 32 is conducted along one path through an image preserving delay section 36 of the system to enable subsequent programmed data sampling operations in image sampler 38 from which a plurality of data outputs 40 are fed to a 3D image display 42. The split beam portion 34 from which target ranging information is obtained, is fed to a pulse converter 44 through which the imaging energy of each echo pulse 22 is converted into an electrical signal and fed to a pulse dividing counter section 46 of the system. Programmed operation of the pulse converter 44 and counter section 46 are controlled by a data processing computer 48 to produce timing pulse signals conducted along outputs 50 to the aforementioned image sampler 38. The image ranging data so derived from the split beam portion 34 is introduced to the display 42 through the sampler 38 to produce a three-dimensional image of the target 16 based on extraction of both two-dimensional and target ranging data from each echo pulse 22 as an independent data source.

Figure 3:
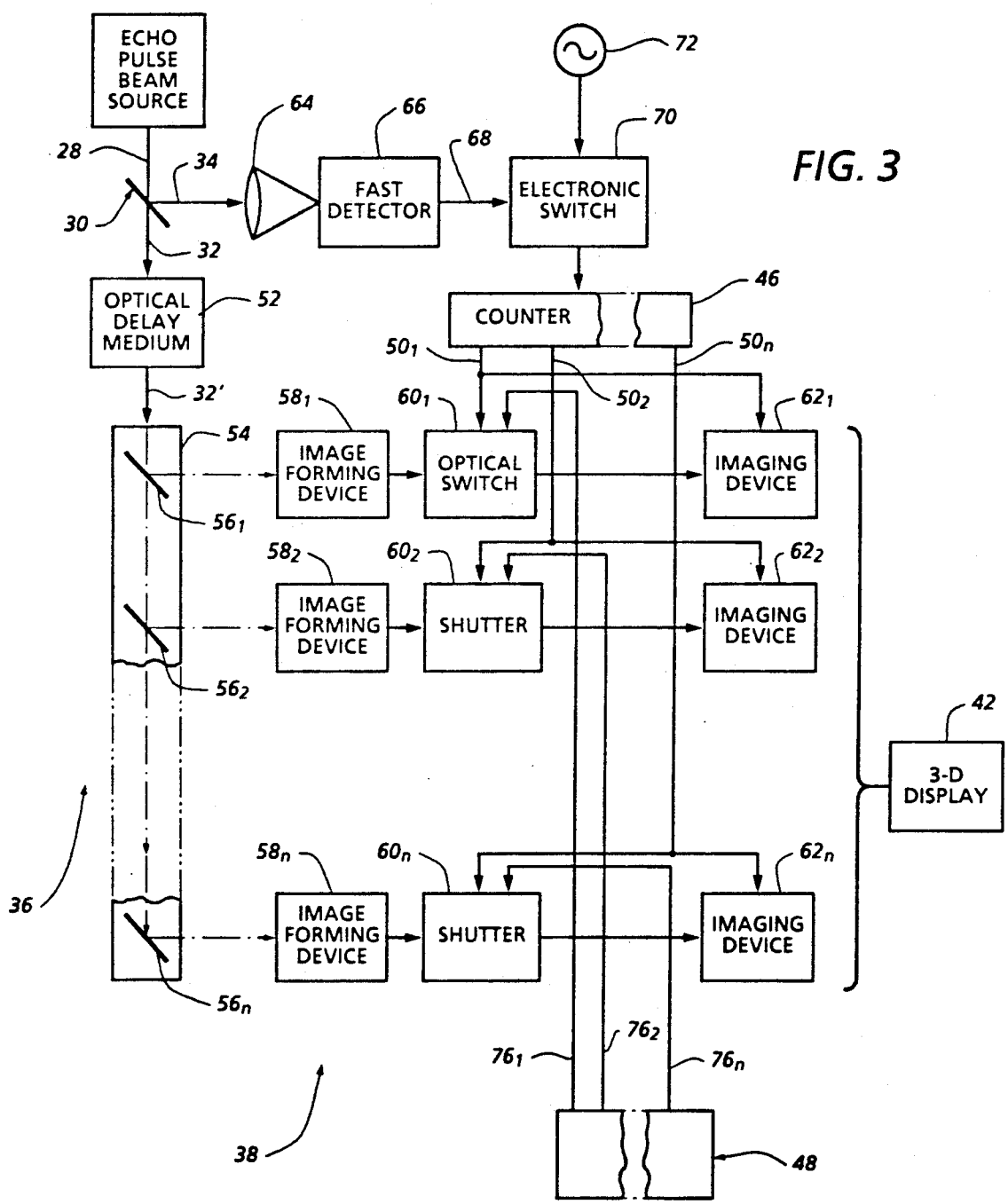
FIG. 3 is a more detailed block diagram of the receiver component diagrammed in FIG. 2.

The components of the receiver system 14 as diagrammed in FIG. 2, are shown in greater detail in FIG. 3 in accordance with one embodiment of the invention. The beam splitter 30 which is generally known in the art passes the beam portion 32 through a first image preserving optical delay medium 52 of the delay section 36, such as water, to slow down the pulse propagation rate by a factor of c/n, where n is the refractive index of 1.33 for water as the delay medium. The slowed down beam portion 32' then passes through a second delay medium 54 having a refractive index greater than unity and a plurality of beam splitters $56_1, 56_2, \ldots 56_n$ therein. Each beam splitter 56 passes a reduced amplitude version of a complete echo pulse, being sampled thereby, to a corresponding one of a plurality of image forming devices $58_1, 58_2, \ldots 58_n$ of the image sampler 38. Real images sampled or "split-off" from the main beam by the beam splitters 56 are thereby fed to optical window-opening switches or shutters $60_1, 60_2, \ldots 60_n$ rapidly turned on and off under control of the timing signals in lines $50_1, 50_2, \ldots 50_n$ from the counter section 46. The timing signals also control opto-electric imaging devices $62_1, 62_2, \ldots 62_n$ associated with the display 42 to which the shutters 60 gate the supply of the sampled real image data. The imaging devices have the capability of capturing and storing an image very quickly for subsequent readout. Devices 62 are of a conventional type known in the art, such as CCD or scanned phototubes used in very high speed, analogue transient-capture oscilloscopes.

Development of the timing control signals in lines 50 by the pulse dividing counter section 46 involves passage of the split echo beam portion 34 from splitter 30 through a lens 64, as diagrammed in FIG. 3. A fast detector 66 converts each pulse of the split beam portion 34 to an electrical signal containing the target ranging data. Thus, the leading edge of the signal in output line 68 from detector 66 corresponds to the arrival at the receiving location of luminant reflected from the closest portion of the target object 16. The signal in output line 68 is fed to an electronic switch 70 to control turn-on for a very short duration (such as a fraction of a nanosecond) during which an oscillating signal is passed from oscillator 72 to the high speed counter 46. The counter 46 contains a plurality of frequency divider circuits respectively counting a preset number of pulses from oscillator 72 to supply a timing pulse control signal of short duration to a corresponding one of the output lines 50. Such timing control signals in the lines 50 are spaced in time from each other by the duration of the preset number of counted oscillator pulses and are of sufficient amplitude to operate the aforementioned optical shutter switches 60 in conjunction with programmed control of computer 48 through signal control lines $76_1, 76_2 \ldots 76_n$ as diagrammed in FIG. 3.

The image data extracting operations hereinbefore referred to are repeated in a time sequence by successive turn-on of the image sampling optical shutters 60 at predetermined times in accordance with the timing signal pulses in lines 50. The optical image data thereby passed through shutters 60 travel at a rate determined by the speed of light in delay medium 54 for storage of a series of sampled images through the devices 62 under control of the memory section of computer 48 as diagrammed in FIG. 3. The target depths of the corresponding sampled images in any series are calculated by multiplying the time duration between image data pulses by the speed of light in medium 54. Each image of a series therefore corresponds to a depth slice of the entire target image having a thickness that is a function of the duration of optical shutter opening multiplied by the speed of light. Thus, three-dimensional image information on the target object 16 stored in the devices 62 may correspond, for example, to a temporal series of two-dimensional internal images (depth slices), spaced apart in time by one nanosecond and spaced apart in depth by 30 cm. The two-dimensional resolution of such image information is set by the frequency of the luminant energy emitted from source 12 and the image resolution properties of the input collector 26 the delay medium 52 and the image forming devices 58 aforementioned. The depth range or third dimension resolution is a direct function of the open duration of the optical shutters 60. To avoid noticeable image blurring, the duration of the luminant energy pulses 18 emitted by source 12 must be considerably smaller than the product of the optical shutter open duration and the speed of light.

The number of depth slices of the image, as aforementioned, is set by the number of spitters 56 in the delay medium 54, while the time spacing therebetween is set by the divider circuits in the counter 46. In general, to obtain complete coverage of a target object 16, the number (N) of depth slices of a depth resolution Zo, should conform to: $Nzo > Z$, where Z is the target depth.

It will be apparent from the foregoing description that in accordance with the present invention a temporally ordered series of slices of each incoming echo pulse 22 is produced containing two-dimensional image data. Such image pulse slices by virtue of their time ordered relationship enable extraction of image depth data which together with the two-dimensional data provide three dimensional image information.

Numerous other modifications and variations of the present invention are possible in light of the foregoing teachings. It is therefore to be understood that within the scope of the appended claims the invention may be practiced otherwise than as specifically described.

What is claimed is:

1. In a target observation system having means generating pulses of luminant energy for illuminating a target and receiver means at a receiving location for reception of echo pulses of the luminant energy reflected from the target, the improvement residing in said receiver means including means for sampling the luminant energy from each of the echo pulses, means for extracting target data from the sampled luminant energy of each of the echo pulses, and data processing control means responsive to said reception of each of the echo pulses for establishing said target data exclusively as a function of distance traveled by the luminant energy in each of the pulses between the target and said receiving location, beam splitting means for establishing separate paths along which the luminant energy of each of the echo pulses is conducted to the sampling means and the data processing control means, respectively.

2. The system of claim 1 including imaging means for extracting image information from the sampled luminant energy of each of said echo pulses together with said extraction of the target data to provide a three dimensional display of the target.

3. The system of claim 2 wherein said data processing control means comprises means for generating a control pulse in response to said reception of each of the echo pulses and counter means for dividing said control pulse into timing signals fed to the sampling means.

4. The system of claim 3 wherein the sampling means includes a plurality of optical shutters respectively controlled by the timing signals fed thereto from the control pulse generating means, a signal delay medium through which the luminant energy is conducted along one of said separate paths and output means transmitting the luminant energy from the signal delay medium to the optical shutters during timed intervals under control of the timing signals for enabling said extraction of the imaging information by the imaging means.

5. The system of claim 1 wherein said data processing control means comprises means for generating a control pulse in response to said reception of each of the echo pulses and counter means for dividing said control pulse into timing signals fed to the sampling means.

6. In a target observation system having means for illuminating a target with luminant energy and receiver means for reception of echo pulses of the luminant energy reflected from the target, the improvement residing in said receiver means including means for sampling the luminant energy of the echo pulses, means for extraction of target data from the sampled luminant energy and means responsive to said reception of the echo pulses for controlling said extraction of the target data, comprising means for generating a control pulse in response to said reception of each of the echo pulses and counting means dividing said control pulse into time-spaced signals fed to the sampling means for gating said extraction of the target data as a function of distance traveled by each of the echo pulses from the target.

7. The system of claim 6 including imaging means for extracting image information from the sampled luminant energy of each of the echo pulses together with said extraction of the target data to provide a three dimensional display of the target.

8. In a target observation system having means generating pulses of luminant energy for illuminating a target and receiver means at a receiving location for reception of echo pulses of the luminant energy reflected from the target, the improvement residing in said receiver means including means for sampling the luminant energy from each of the echo pulses, means for extracting target data from the sampled luminant energy of each of the echo pulses, and data processing control means responsive to said reception of each of the echo pulses for establishing said target data exclusively as a function of distance traveled by the luminant energy in each of the pulses between the target and said receiving location, said data processing control means comprising means for generating a control pulse in response to said reception of each of the echo pulses and counter means for dividing said control pulse into timing signals fed to the sampling means, the sampling means including a plurality of optical shutters respectively controlled by the timing signals fed thereto from the control pulse generating means, a signal delay medium through which the luminant energy is conducted and output means transmitting the luminant energy from the signal delay medium to the optical shutters during timed intervals under control of the timing signals for enabling said extraction of the imaging information by the imaging means.

9. In a target observation system having means generating pulses of luminant energy for illuminating a target and receiver means at a receiving location for reception of echo pulses of the luminant energy reflected from the target, the improvement residing in said receiver means including means for sampling the luminant energy from each of the echo pulses, means for extracting target data from the sampled luminant energy of each of the echo pulses, and data processing control means responsive to said reception of each of the echo pulses for establishing said target data exclusively as a function of distance traveled by the luminant energy in each of the pulses between the target and said receiving location, the means for sampling including a plurality of optical shutters respectively controlled by timing signals fed thereto from the means for extracting, a signal delay medium through which the luminant energy is conducted and output means transmitting the luminant energy from the signal delay medium to the optical shutters during timed intervals under control of the timing signals for enabling extraction of the imaging information.

10. In a target observation system having means generating pulses of luminant energy of predetermined duration for illuminating a target and receiver means at a receiving location for reception of echo pulses of the luminant energy reflected from the target, the improvement residing in said receiver means including beam splitting means for establishing separate paths along which the luminant energy of the echo pulses is conducted, means sampling the luminant energy conducted along one of said paths for extraction of image information therefrom and data processing control means responsive to the luminant energy conducted along another of said separate paths for limiting said sampling of the luminant energy to time intervals within said predetermined duration enabling extraction of target data from the image information.

11. The system of claim 10 wherein said data processing control means comprises means for generating a control pulse in response to said reception of each of the echo pulses and counter means for dividing said control pulse into timing signals fed to the sampling means.

12. A method of extracting target ranging information at a receiving location from an echo pulse of imaging energy of predetermined duration, including the steps of: establishing two separate paths at the receiving location along which the imaging energy is conducted; sampling the imaging energy conducted along one of said separate paths; developing timing control signals in response to the imaging energy conducted along the other of the separate paths; and limiting said sampling of the imaging energy to sequential time delayed intervals in accordance with the timing control signals developed.

13. In a target observation system having means for illuminating a target, receiver means for reception of echo pulses of predetermined duration reflected from the target and image display means operatively connected to the receiver means for extraction of imaging data from the echo pulses, the improvement residing in said receiver means including gating means for dividing each of said echo pulses into time separated slices representing depth of the target and timing control means responsive to said reception of the echo pulses for limiting said slices of the echo pulses to separate sequential intervals within the predetermined duration of each of the echo pulses.

14. In combination:
(a) means for generating successive pulses of radiant energy;
(b) lens means for receipt of such radiant energy of said pulses reflected by an object;
(c) means for converting such pulses reflected from the object into imaging signals;

(d) shutter means operable for conduction therethrough of the imaging signals; and
(e) control means for selectively operating said shutter means in response to reception of the radiant energy by the lens means to effect sampling of the imaging signals, said sampling being made in accordance with time patterns in respective time periods of the pulses reflected from the object following said reception of the radiant energy.

* * * * *